United States Patent
Rodriguez-Conde et al.

(10) Patent No.: US 12,030,638 B2
(45) Date of Patent: Jul. 9, 2024

(54) ON-BOARD TOILET CUBICLE

(71) Applicant: FACC AG, Ried im Innkreis (AT)

(72) Inventors: Jesus Rodriguez-Conde, Wels (AT);
Elisabeth Hoeller, Raab (AT);
Bernhard Hatzmann, Hofkirchen (AT);
Maximilian Guerocak, Passau (DE)

(73) Assignee: FACC AG, Ried im Innkreis (AT)

( * ) Notice: Subject to any disclaimer, the term of this patent is extended or adjusted under 35 U.S.C. 154(b) by 117 days.

(21) Appl. No.: 17/756,903

(22) PCT Filed: Dec. 4, 2020

(86) PCT No.: PCT/AT2020/060431
§ 371 (c)(1),
(2) Date: Jun. 3, 2022

(87) PCT Pub. No.: WO2021/108825
PCT Pub. Date: Jun. 10, 2021

(65) Prior Publication Data
US 2023/0013546 A1    Jan. 19, 2023

(30) Foreign Application Priority Data
Dec. 4, 2019    (AT) .............................. A 50213/2019

(51) Int. Cl.
*B64D 11/02*    (2006.01)
*B64C 1/14*    (2006.01)

(52) U.S. Cl.
CPC ............ *B64D 11/02* (2013.01); *B64C 1/1423* (2013.01)

(58) Field of Classification Search
CPC ............ B64D 11/02; B64D 2011/0046; B64C 1/1423; E06B 3/7007; E06B 5/00; A47K 4/00
(Continued)

(56) References Cited

U.S. PATENT DOCUMENTS

| 2004/0163170 A1* | 8/2004 | Cooper | .................. B64D 11/02 4/664 |
| 2005/0230539 A1* | 10/2005 | Quan | .................... B64D 11/02 244/118.1 |

(Continued)

FOREIGN PATENT DOCUMENTS

| CN | 2764904 Y | * | 3/2006 | ................ B60P 3/37 |
| CN | 2764904 Y |   | 3/2006 | |

(Continued)

OTHER PUBLICATIONS

"Ecken—Sondertüren: eine dreidimensionale L-förmige inovative Türlösung für den Individualisten (Corners—special doors: a three-dimensional L-shaped innovative door solution for the individualist)," Adrik Website, Available Online at https://adrik.de/innentueren/EL-3/Start_EL-3.html, Available as Early as Oct. 19, 2010, 25 pages. (Submitted with Machine Translation of Website).

(Continued)

*Primary Examiner* — Lori L Baker
(74) *Attorney, Agent, or Firm* — McCoy Russell LLP

(57) ABSTRACT

An on-board toilet cubicle for an aircraft, including a front long side and a rear long side; a front short side and a rear short side, which are each connected at one end to the front long side and at their other end to the rear long side, the long sides and the short sides enclosing an interior of the toilet cubicle, and the front and the rear long sides each being wider than the front and the rear short sides; a toilet unit with a toilet opening; and an L-shaped door for accessing the on-board toilet cubicle, the L-shaped door having one door leg in the front long side and one door leg in the front short side, the toilet unit arranged adjacent to the rear long side, and the door leg in the front long side being wider than the door leg in the front short side.

17 Claims, 8 Drawing Sheets

(58) Field of Classification Search
USPC .................................................... 4/479–480
See application file for complete search history.

(56) References Cited

U.S. PATENT DOCUMENTS

2012/0261509 A1* 10/2012 Grant ..................... B64D 11/02
4/664
2019/0248495 A1    8/2019 Seibt

FOREIGN PATENT DOCUMENTS

| WO | WO-2019077476 A1 * | 4/2019 | ........... A61G 3/0816 |
| WO | WO-2020002239 A1 * | 1/2020 | ................ B60P 3/34 |

OTHER PUBLICATIONS

ISA European Patent Office, International Search Report Issued in Application No. PCT/AT2020/060431, Feb. 10, 2021, WIPO, 4 pages.
Intellectual Property India, Examination Report Issued in Application No. 202217036783, Nov. 11, 2022, 5 pages.

* cited by examiner

ON-BOARD TOILET CUBICLE

CROSS REFERENCE TO RELATED APPLICATIONS

The present application is a U.S. National Phase of International Application No. PCT/AT2020/060431 entitled "ON-BOARD TOILET CUBICLE," and filed on Dec. 4, 2020. International Application No. PCT/AT2020/060431 claims priority to Austrian Patent Application No. GM 50213/2019 filed on Dec. 4, 2019. The entire contents of each of the above-listed applications are hereby incorporated by reference for all purposes.

TECHNICAL FIELD

The disclosure relates to an on-board toilet cubicle, in particular an on-board toilet cubicle for an aircraft, comprising:
- a front and a rear long side,
- a front and a rear short side, which are each connected at one end to the front long side and at their other end to the rear long side,
- the long sides and the short sides enclosing an interior of the on-board toilet cubicle, and the front and the rear long sides each being wider than the front and the rear short sides,
- a toilet unit with a toilet opening, and
- an L-shaped door for accessing the on-board toilet cubicle, the L-shaped door having one door leg in the front long side and one door leg in the front short side.

The disclosure also relates to an aircraft having an on-board toilet cubicle.

BACKGROUND AND SUMMARY

Current on-board toilet cubicles, in particular in aircraft, are suitable for disabled people only to a limited extent. One reason for this is the confined space conditions. The on-board toilet cubicles often extend in one direction more than in a direction orthogonal thereto. Various attempts have already been made in the past to improve on-board toilet cubicles in terms of their suitability for disabled people.

For instance, US 2012/0261509 A1 discloses an on-board toilet having a toilet door on the shorter side of the toilet cubicle and the toilet itself on the opposite shorter side of the toilet cubicle. A washbasin countertop is situated on one of the longer sides of the toilet cubicle. A free space for the legs of a wheelchair user is formed under the washbasin countertop. However, it is disadvantageous that the wheelchair user must turn by a large angle in order to be able to sit on the toilet. Furthermore, there is little space for the turning movement, and the wheelchair user and the body's center of gravity cannot be moved close to the toilet seat owing to the arrangement of the toilet. Finally, a large longitudinal extent of the toilet cubicle is necessary to be able to accommodate the wheelchair.

The object of the present invention is moderating or overcoming at least some disadvantages of the prior art. In particular, the invention aims to provide an on-board toilet cubicle which is easier to use for a person with limited mobility, in particular a wheelchair user. This aim should be achieved in particular in the case of an on-board toilet cubicle which is subject to confined space conditions. Preferably, the wheelchair user should have to turn their body by the smallest possible turning angle in order to sit on the toilet; the body's center of gravity in particular should be displaced as little as possible. Preferably, space for the wheelchair and the wheelchair user, in particular their knees, should be allowed in confined space conditions.

This object is achieved by an on-board toilet cubicle. According to the invention, the toilet unit is arranged adjacent to the rear long side of the cubicle. The door leg in the front long side is wider than the door leg in the front short side of the cubicle.

The wheelchair user in the wheelchair takes up more space in the direction of travel than transversely thereto. The provision of the toilet unit at the rear long side means that a larger part of the longitudinal extent of the toilet can advantageously be used by orienting the longitudinal extent of the wheelchair obliquely to the short side of the toilet cubicle, approximately parallel to the long side. The wheelchair user can thus roll alongside the toilet unit. The toilet unit therefore does not block a part of the longitudinal extent of the toilet cubicle, which would be the case if the toilet were arranged on a short side. It is made possible to enter the toilet cubicle (almost) parallel to the front and/or rear long side by the arrangement of the door leg of the L-door even if the toilet is small, in particular if the extent of the short sides is small, since the wheelchair can be guided through the region opened up by the wider door leg on the front long side. Furthermore, the design according to the invention makes assisted guidance of the wheelchair user into the on-board toilet cubicle easier or even possible for the first time.

Preferably, the long sides and short sides are each formed by walls, and the door can form a part of the walls. In particular, the front long side adjoins the front short side, the front short side adjoins the rear long side, the rear long side adjoins the rear short side, and the rear short side adjoins the front long side. Preferably, the rear and front long sides, or sections thereof in each case, are parallel to each other, and/or the rear and front short sides, or sections thereof in each case, are parallel to each other. The front and rear short sides preferably have an angle of between 75° and 105°, in particular of 90°, to the front and rear long sides. In particular, connecting sections between the long sides and the short sides can be curved in a view from above or in a cross-section through a plane parallel to a floor surface. This is the case in particular in an aircraft, so that the on-board toilet cubicle can follow the curved outer contour of the aircraft. The rear short side, the front short side, the rear long side and/or the front long side can be curved in vertical profile.

For the purposes of the present disclosure, the width of the long sides and short sides is calculated as a horizontal width at a height of 1 mm above a floor. The location and direction information, such as "horizontal", "vertical", "top", "bottom" etc., relates to the intended installation state of the on-board toilet when the means of transport, in particular aircraft, equipped therewith is oriented horizontally. If the connecting sections between two mutually adjoining sides are rounded when viewed from above, the end point for the width is considered to be an intersection of an imaginary extension of a straight section of the respective sides. Preferably, the long sides and short sides form a rectangle in cross-section parallel to a horizontal plane, the long sides forming the long sides of the rectangle, and the short sides forming the short sides of the rectangle. The combination of features thus makes it possible for a wheelchair user to use the toilet particularly easily in confined space conditions. The door leg in the front long side is the wider door leg, and the door leg in the front short side is the narrower door leg. The term "wider" relates to a horizontal extent in the direction of the respective long or short side at a height of 1 m above a floor. Distance and length information relates to the external dimensions, i.e., facing away from the on-board toilet cubicle, i.e., the thickness of the walls is included.

The front and rear long sides are each preferably at least 1.05 times, particularly preferably at least 1.1 times, even more preferably at least 1.15 times or 1.2 times wider than the front and rear short sides. The front and rear long sides are each preferably at least 10 cm, particularly preferably at least 25 cm, even more preferably at least 40 cm wider than the front and rear short sides. The wider door leg is preferably at least 1.1 times, particularly preferably at least 1.25 times, even more preferably at least 1.4 times wider than the narrower door leg.

The on-board toilet cubicle is designed for use in means of transport (such as aircraft, ships, road vehicles such as motorhomes, buses or rail vehicles). Particularly preferably, the on-board toilet cubicle is an on-board toilet cubicle for an aircraft. Often, on-board toilet cubicles of different sizes and shapes are provided in an aircraft; the present on-board toilet cubicle is preferably the larger type provided for example in long-haul flights. The front and rear short sides have a width which is in each case preferably greater than 0.8 m, particularly preferably greater than 1.2 m, even more preferably greater than 1.5 m. The front and rear long sides have a width which is in each case preferably greater than 1 m, particularly preferably greater than 1.4 m, even more preferably greater than 1.7 m. On the other hand (in particular because of limited space conditions) the front and rear short sides have a width which is in each case preferably smaller than 2 m, particularly preferably smaller than 1.8 m, even more preferably smaller than 1.7 m, and the front and rear long sides have a width which is in each case preferably smaller than 2.2 m, particularly preferably smaller than 2 m, even more preferably smaller than 1.9 m.

The toilet unit preferably has a toilet seat area which surrounds the toilet opening. The toilet seat area extends substantially in one plane. A folding toilet seat can also be provided, which can fold by substantially 90°. "Toilet unit" means in particular the unit delimited in the horizontal direction by the edges of the (substantially horizontal) toilet seat area.

It is preferred if a toilet seat axis forms an angle of less than 45°, preferably less than 30°, with a normal of the rear long side, the toilet seat axis preferably running substantially parallel to the normal of the rear long side. The toilet seat axis is formed by the axis of symmetry of a person using the toilet. Preferably, the toilet seat axis is defined by an edge, facing the front long side, of the toilet seat area and the toilet unit. Preferably, a toilet axis bisecting the toilet opening or an axis bisecting the (folding) toilet seat (in the folded-down state) forms an angle of less than 45°, preferably less than 30°, with normal of the rear long side and preferably runs substantially parallel to normal of the rear long side. The necessary turning angle of a wheelchair user can be reduced thereby while gaining space.

In an advantageous embodiment, the hinge point of the door is provided on the front short side. This means that the shorter door leg has the hinge point about which the door is pivotable. When the door is pivoted fully open so that the door leg which is provided in the front short side when in the closed state (almost) bears against an outer side of the front short side, the longer door leg can advantageously form a privacy screen in a corridor running along the front short side. The possible opening angle of the door can also be increased in this way, for example when the rear short side is arranged on a wall of a vehicle, in particular an aircraft, which would block full opening of the door if a hinge point were on the front long side.

It is advantageous when the perpendicular distance of the toilet unit and/or the toilet opening from the front long side is more than 1.5 times, preferably more than 2 times, particularly preferably more than 3 times the perpendicular distance of the center point of the toilet opening from the rear long side. Advantageously, this describes the distance from the edge or the distance from the center point (i.e., the center point of the area when view from above) of the element in question. More free space for a wheelchair user can thus be created.

It is preferred when the perpendicular distance of the toilet unit and/or the toilet opening from the front long side is more than 25%, preferably more than 35%, particularly preferably more than 45% of the width of the rear and/or front short sides. Advantageously, this describes the distance from the edge or the distance from the center point (i.e., the center point of the area when view from above) of the element in question.

In a preferred embodiment, the perpendicular distance of the center point of the toilet opening from the front short side is more than 15%, preferably more than 20%, particularly preferably more than 30% of the width of the rear long side. This improves the accessibility of the toilet, since, for example, space is created for the turning of a wheelchair user's body onto the toilet.

It is advantageous when the perpendicular distance of the center point of the toilet opening from the rear short side is more than 25%, preferably more than 35%, particularly preferably more than 45% of the length of the rear long side. This can improve the accessibility of the toilet to a wheelchair user, who can bring their body's center of gravity closer to the toilet while sifting in the wheelchair, since there is space for their legs.

It is preferred when the toilet unit comprises a seat area in which the toilet opening is provided, an oblique section of a horizontal edge, facing the front long side, of the seat area forming an angle of between 1° and 60°, preferably between 5° and 45°, with the rear long side. The edge terminates the seat area at least in one region towards the front long side. In this way, a necessary turning angle of a wheelchair user can be reduced. On the other hand, it can thus be made possible for the wheelchair user to have easy access to elements arranged on the rear short side, for example toilet paper or a washbasin, while sifting on the seat area. The wheelchair user enters the on-board toilet cubicle in particular parallel to the oblique section of the edge. Advantageously, a straight section of the edge runs parallel to the rear long side and/or to the normal of the rear short side.

In an advantageous embodiment, the oblique section of the edge lies on a straight line which intersects the door leg on the front short side, preferably the half of the door leg which is closer to the rear long side. The space for a wheelchair user to enter is thus enlarged.

It is advantageous when a starting point, facing the front short side, of the oblique section of the edge on the seat area comprises a perpendicular distance from the front short side which is smaller than the longitudinal extent of the door leg on the front long side. This makes it easier for the wheelchair user to enter the on-board toilet cubicle parallel to the oblique section of the edge. Preferably, the straight section of the edge adjoins the starting point in the other direction.

In a preferred embodiment, the on-board toilet cubicle has a washbasin unit with a washbasin, the washbasin unit being arranged adjacent to the rear short side. Advantageously, a center point of the area of the inner wall of the well of the washbasin when viewed from above (i.e., measured on the upper area of the opening of the wall) is less than 45 cm, preferably less than 30 cm, particularly preferably less than 15 cm away from the rear short side. The space available to a wheelchair user is thus enlarged.

It is preferred when the washbasin unit and/or the washbasin is arranged adjacent to the front long side. Advantageously, a center point of the area of the inner wall of the well of the washbasin when viewed from above is less than 55 cm, preferably less than 40 cm, particularly preferably less than 25 cm away from the front long side. This creates space for the legs of the wheelchair user on a side, facing the rear long side, of the washbasin unit, for example between the toilet unit and the washbasin unit.

It is preferred when the toilet opening is arranged at a horizontal distance of less than 1.5 m, preferably less than 1 m, particularly preferably less than 80 cm, from the washbasin. Advantageously, this applies in each case to the center points of the elements in question. As a result, a person sitting on the toilet can reach the washbasin.

In an advantageous embodiment, the perpendicular distance of the washbasin from the rear long side is more than 50%, preferably more than 65% of the length of the rear short side. This creates space for the legs of the wheelchair user on a side, facing the rear long side, of the washbasin unit, for example between the toilet unit and the washbasin unit.

Advantageously, handles are provided, onto which a person can hold. These can make it easier, for example, for a wheelchair user to move their body from the wheelchair to the seat area of the toilet. Advantageously, at least one horizontal handle and one vertical handle are provided adjacent to the rear short side. Preferably, the vertical handle is provided closer to the front long side, and the horizontal handle is provided closer to the rear long side.

With reference to the aircraft according to the invention, it is advantageous when the on-board toilet cubicle is arranged such that a corridor adjoining the front short side leads to a seating area for passengers. The longer door leg can thus also act as a privacy screen when in the open state.

BRIEF DESCRIPTION OF THE FIGURES

The invention is explained in more detail below using a preferred embodiment of the on-board toilet cubicle, which is shown in the figures. In detail, the figures show the following.

DETAILED DESCRIPTION

Figure 1:
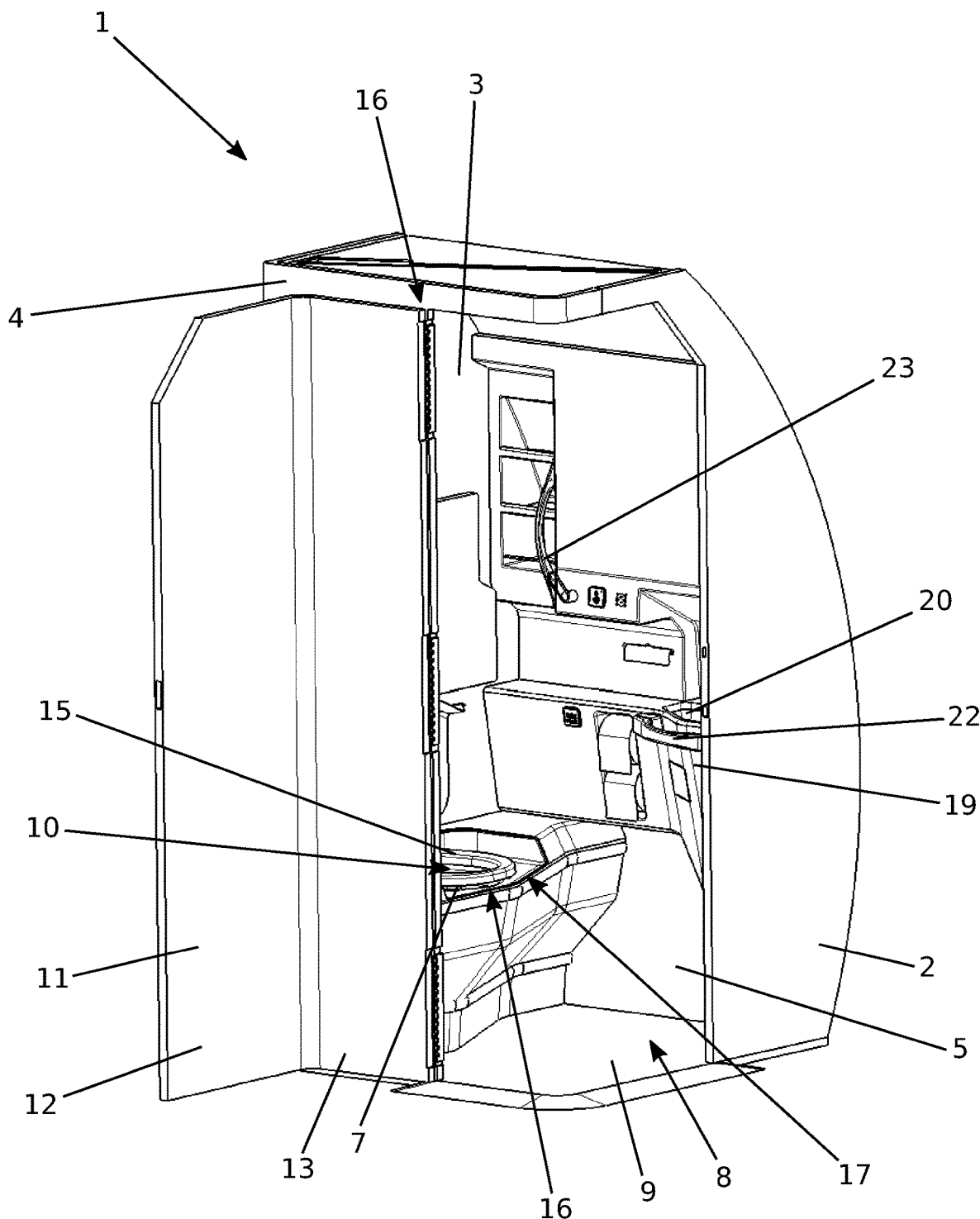
FIG. 1 shows the preferred embodiment of the on-board toilet cubicle in an oblique view.
Figure 2:
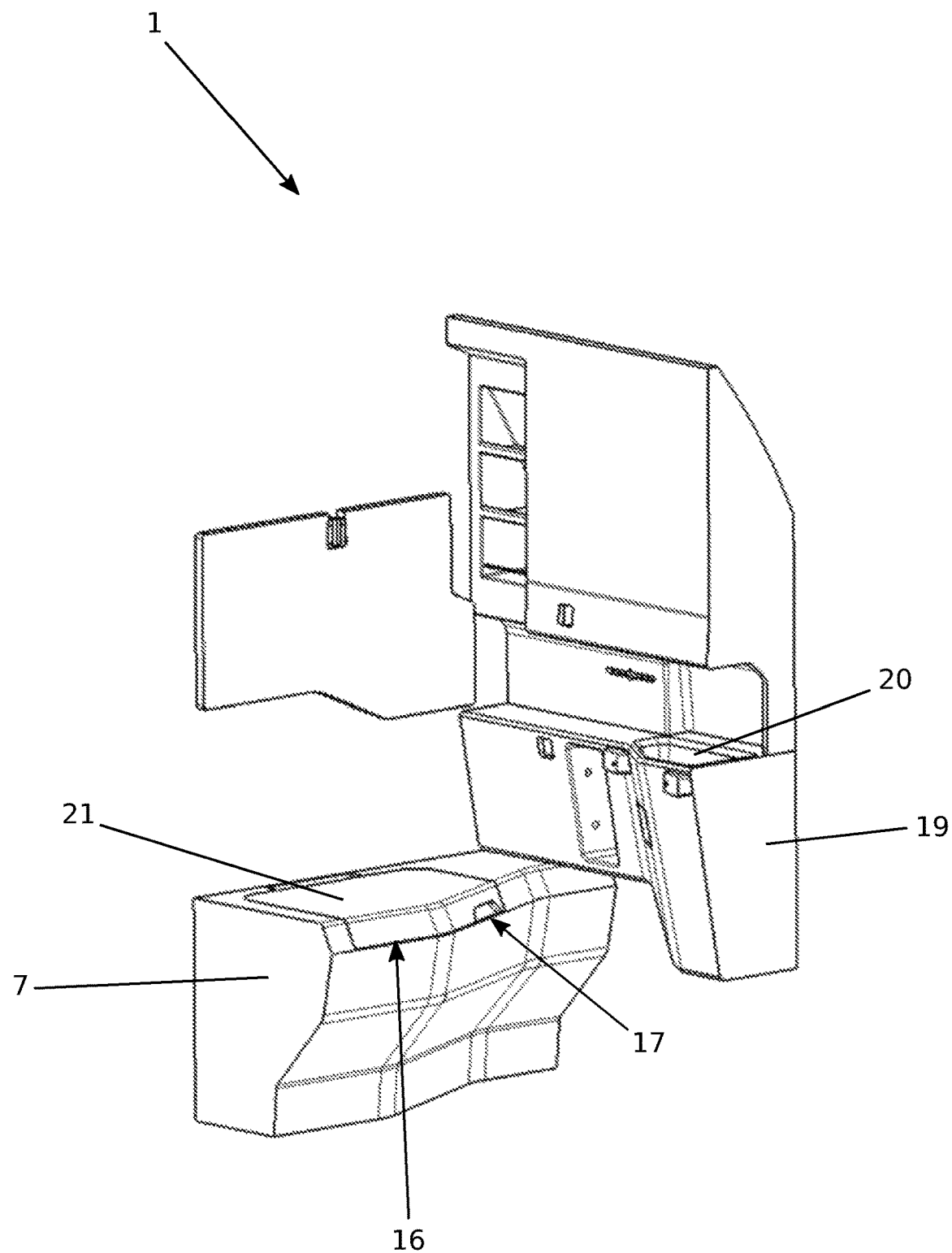
FIG. 2 shows the internal fittings of the same embodiment of the on-board toilet cubicle as FIG. 1.
Figure 3:
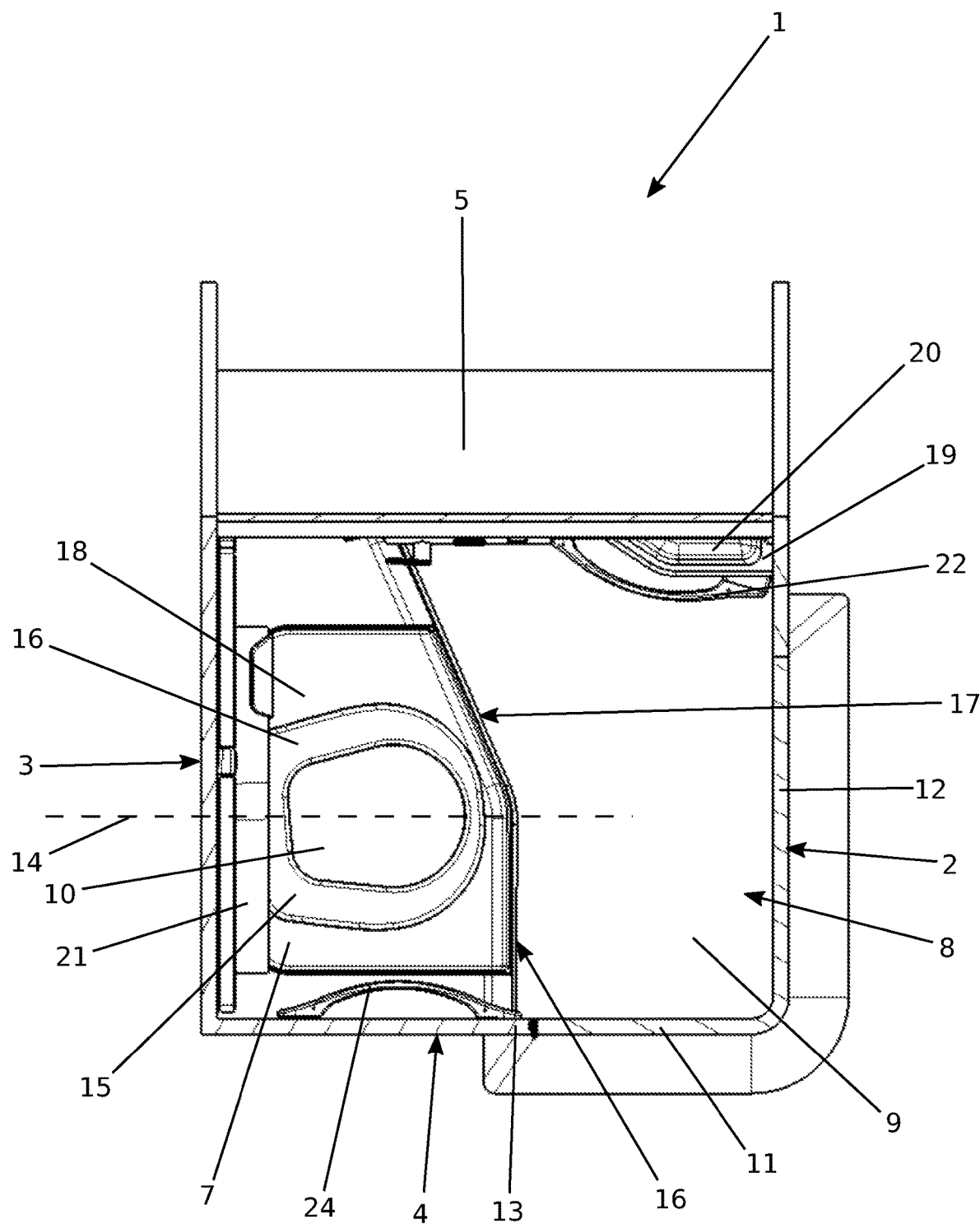
FIG. 3 shows the same embodiment of the on-board toilet cubicle as FIG. 1 with the door closed, in a view from above.
Figure 4:
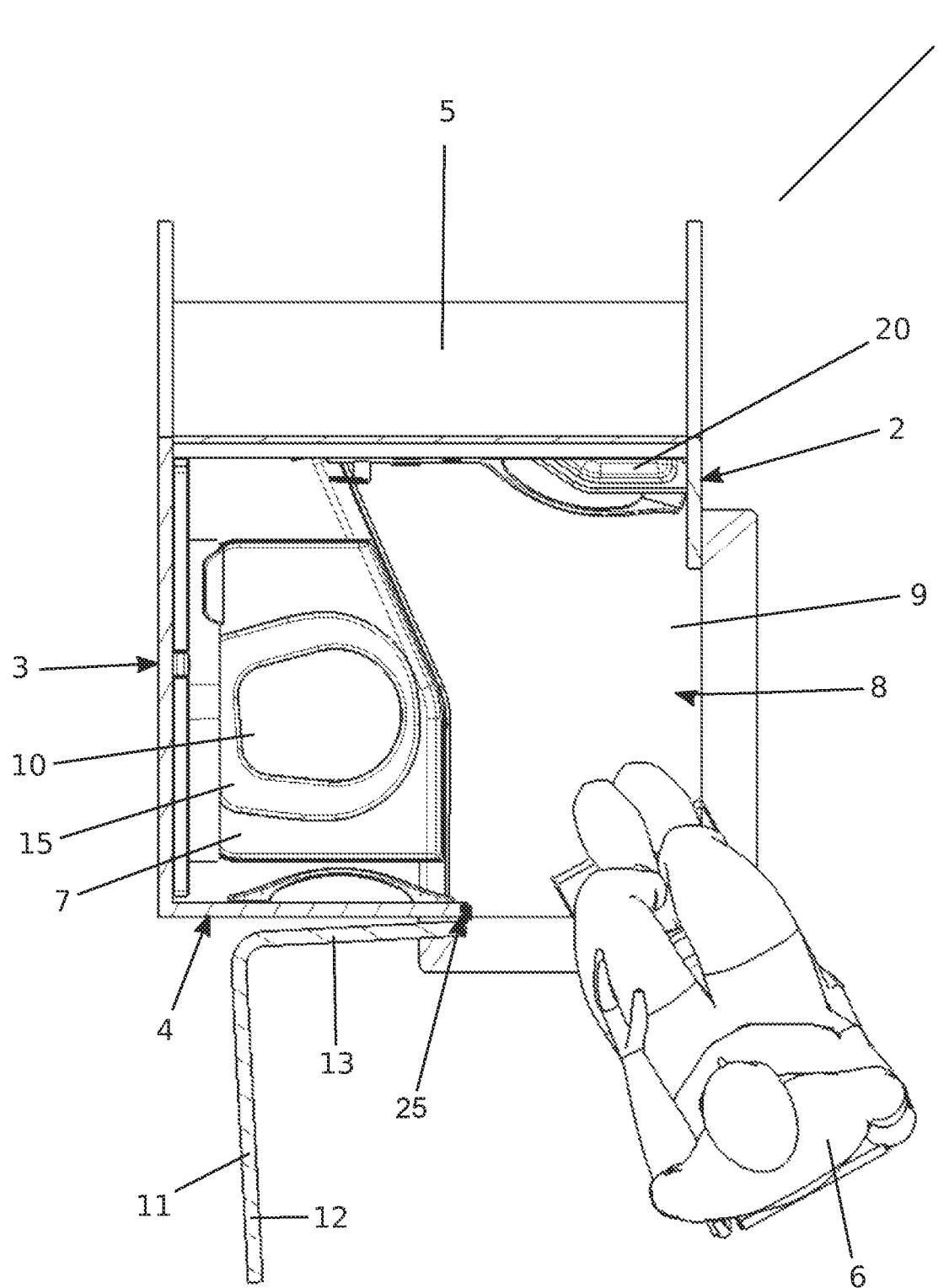
FIG. 4 shows the same embodiment of the on-board toilet cubicle as FIG. 1 with the door open, in a view from above with a wheelchair user partially in the on-board toilet cubicle.
Figure 5:
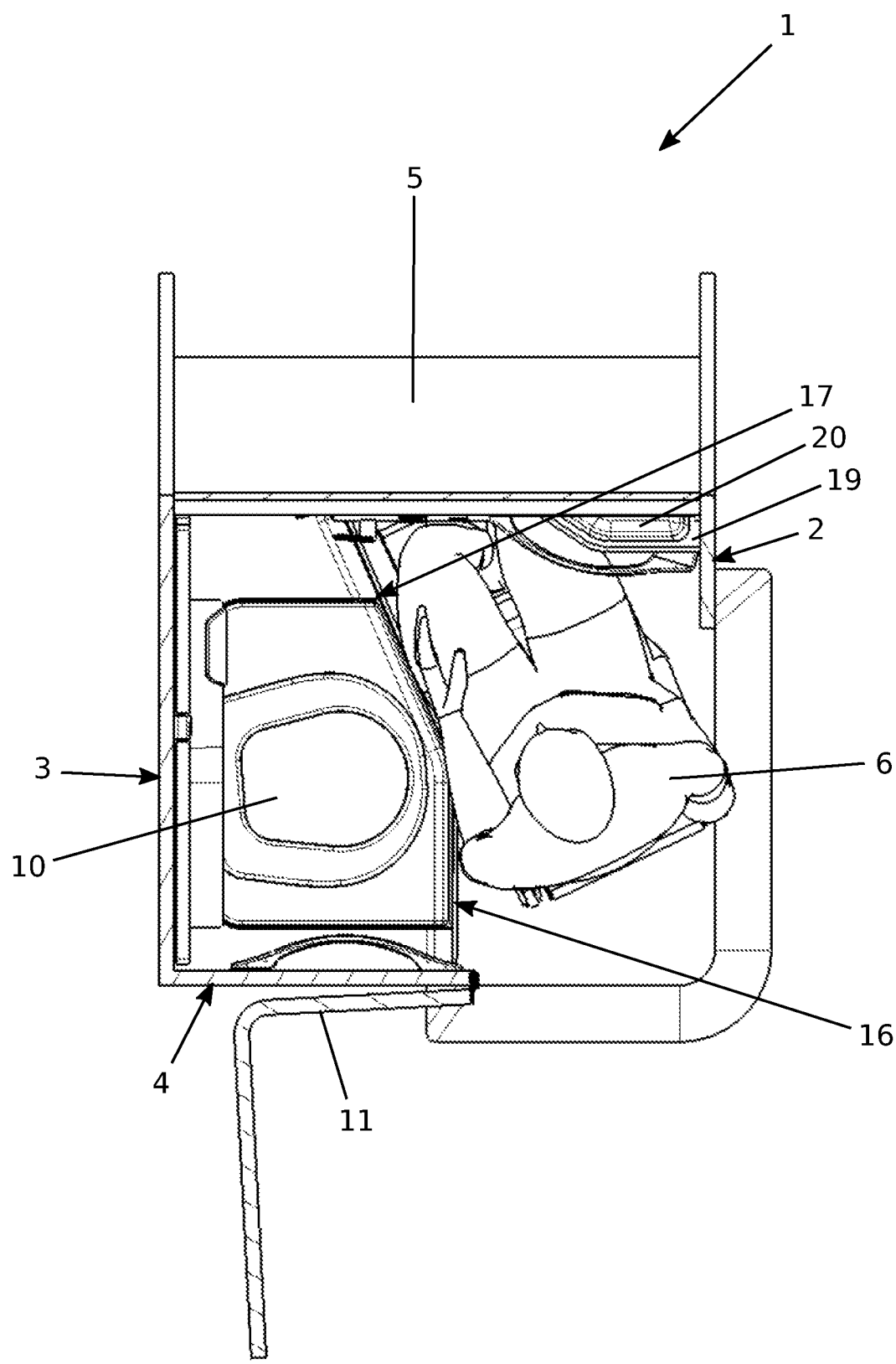
FIG. 5 shows the same view as FIG. 4 with a wheelchair user in the on-board toilet cubicle.
Figure 6:
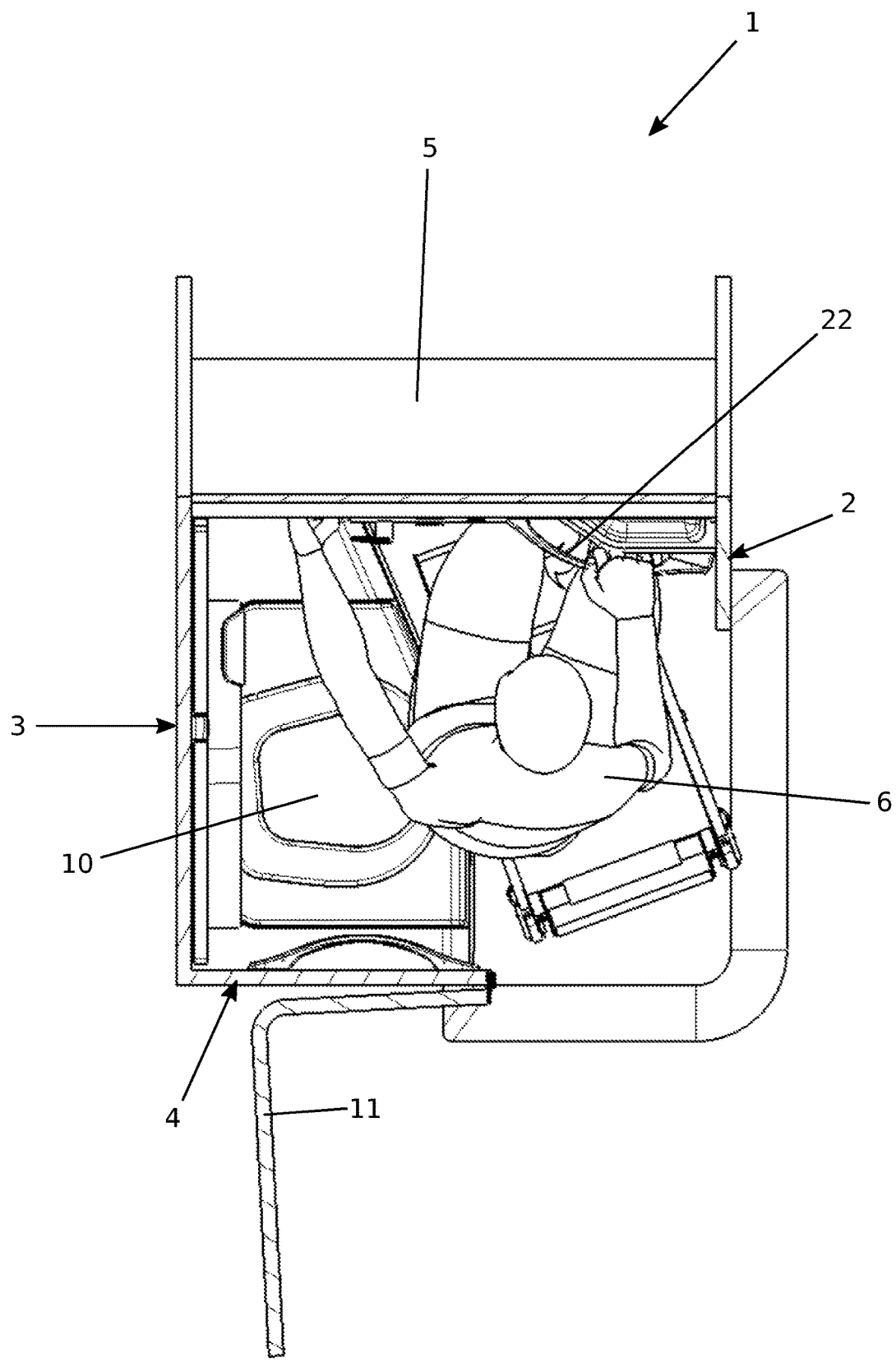
FIG. 6 shows the same view as FIG. 5, with the wheelchair user's body moved partially towards the toilet unit.
Figure 7:
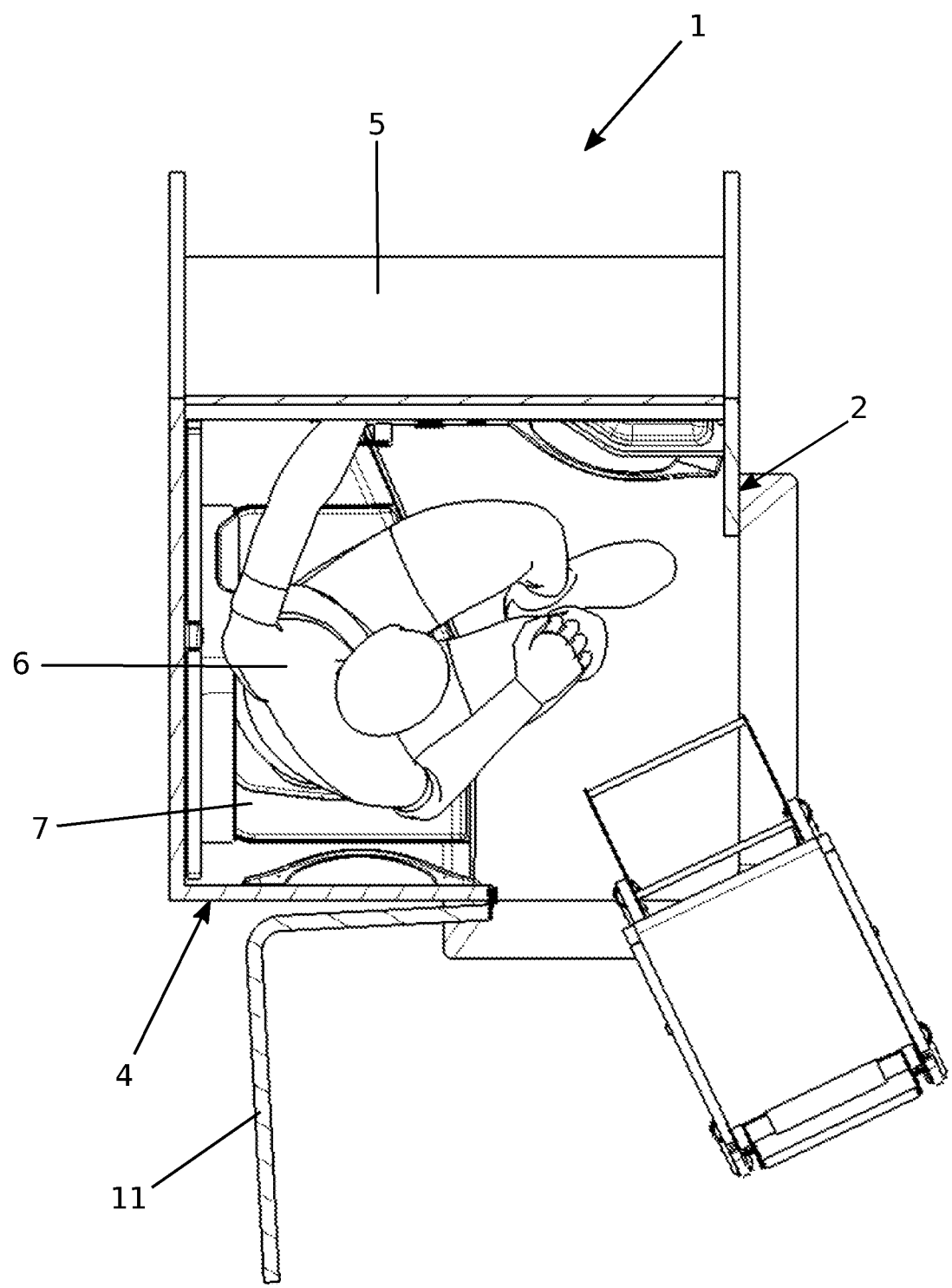
FIG. 7 shows the same view as FIG. 5, in which the person is sitting on the toilet unit and the wheelchair is pushed partially out of the on-board toilet cubicle.

FIGS. 1 to 8 show the same preferred embodiment of the on-board toilet cubicle 1, which is in particular an on-board toilet cubicle for an aircraft. FIG. 1 shows this in an oblique view from the front. FIG. 2 shows the internal fittings of the on-board toilet cubicle 1. FIGS. 3 to 8 show the latter in a view from above, FIGS. 4 to 8 showing the entry of the wheelchair user 6 and the movement of the wheelchair user's 6 body onto the toilet unit 7.

The on-board toilet cubicle 1 comprises a front long side 2, a rear long side 3, a front short side 4 and a rear short side 5. The front short side 4 and the rear short side 5 each proceed from one end of the front long side 3 and of the rear long side 4 and adjoin same. The front long side 2, the rear long side 3, the front short side 4 and the rear short side 5 enclose an interior 8 of the on-board toilet cubicle 1 and delimit the interior 8. The front long side 2 and the rear long side 3 are each wider than the front short side 4 and the rear short side 5, measured as a horizontal width at a height of 1 m above a floor 9 of the on-board toilet cubicle 1 (approximately corresponding to the knee of a person sitting in a wheelchair). In this embodiment, the rear short side 5 is curved in its vertical profile, i.e., in a cross-section parallel to the front long side 2 and is thus adapted to the shape of an aircraft fuselage.

The on-board toilet cubicle 1 comprises a toilet unit 7 with a toilet opening 10. The toilet unit 7 is arranged adjacent to the rear long side 3. An L-shaped door 11 is provided for accessing the on-board toilet cubicle 1. The L-shaped door 11 has (in the closed state; see FIG. 3) a door leg 12 in the front long side 2 and a door leg 13 in the front short side 4. The door leg 12 in the front long side 2 is wider than the door leg 13 in the front short side 4 (in particular at a height of 1 m above the floor 9). Accordingly, the door leg 12 in the front long side 2 is also referred to as the wider door leg 12, and the door leg 13 in the front short side 4 is also referred to as the narrower door leg 13. The hinge point of the door 11, which defines the rotation axis of the door 11, is provided on the front short side 4.

A wheelchair user 6 can thus enter the on-board toilet cubicle 1 almost parallel to the rear long side 3 and can use all or most of the length of the on-board toilet cell 1, the length running in the direction of the (wider) long sides 2, 3. Therefore, a wheelchair user 6 also does not bump into a door post or door frame.

The toilet seat axis 14 (see FIG. 3) forms an angle of approximately 0° with normal of the rear long side 3. In this case, the toilet seat axis 14 is an axis of symmetry bisecting the toilet opening 10 and is normal to a tilting axis of a toilet seat 15. The toilet seat axis 14 thus runs substantially parallel to the normal of the rear long side 3. The distance of a center point of the toilet opening 10 from the front short side 4 is slightly less than half the distance of the center point from the rear short side 5. Also, the distance of the center point of the toilet opening 10 from the front long side 2 is slightly less than half the distance of the center point from the rear long side 3.

The toilet unit 7 also comprises a seat area 18. The seat area 18 will be formed by a surface surrounding the toilet opening 10, i.e., the toilet opening 10 is provided in the seat area 18. In practice, a person using the toilet will usually sit not directly on the seat area 18 but on the (folding) toilet seat

15. The seat area 18 comprises a horizontal edge 16 which faces the front long side 2. The horizontal edge 16 comprises an oblique section 17, which forms an angle of approximately 25° with the rear long side 3. Furthermore, the oblique section 17 of the edge 16 lies on a straight line which intersects the half of the door leg 13 which is on the front short side 4 and is closer to the rear long side 3 (in the closed state of the door 11). A front starting point of the oblique section 17, which delimits the oblique section 17 towards the front short side 4, has a perpendicular distance from the front short side 4 which is smaller than the longitudinal extent of the wider door leg 12. A wheelchair user 6 can thus enter parallel to the oblique section 17 of the edge 16 and position their wheelchair directly adjacent to or touching the toilet unit 7 or the seat area 18 (see FIGS. 4 and 5). Therefore, a wheelchair user 6 only has to move their body's center of gravity slightly from the wheelchair in order to sit on the seat area 18.

The on-board toilet cubicle 1 has a washbasin unit 19 with a washbasin 20. The washbasin unit 19 and the washbasin 20 are arranged adjacent to the rear short side 5. The washbasin unit 19 is directly adjacent to the rear short side 5. Also, the washbasin unit 19 and the washbasin 20 are arranged adjacent to the front long side 2. In this way, there is a space for the legs, for example, of a wheelchair user 6 between the washbasin unit 19 and the toilet unit 7 (see FIG. 5). Also, the washbasin unit 19 can have a cross-section which tapers towards the rear short side 5, i.e., decreases downwards, so that there is also some space for a wheelchair user's 6 body parts under the washbasin unit 19. The toilet opening 10 and the washbasin 20 are arranged at such a horizontal distance from each other that a person sitting over the toilet opening 10 can wash their hands.

Figure 8:
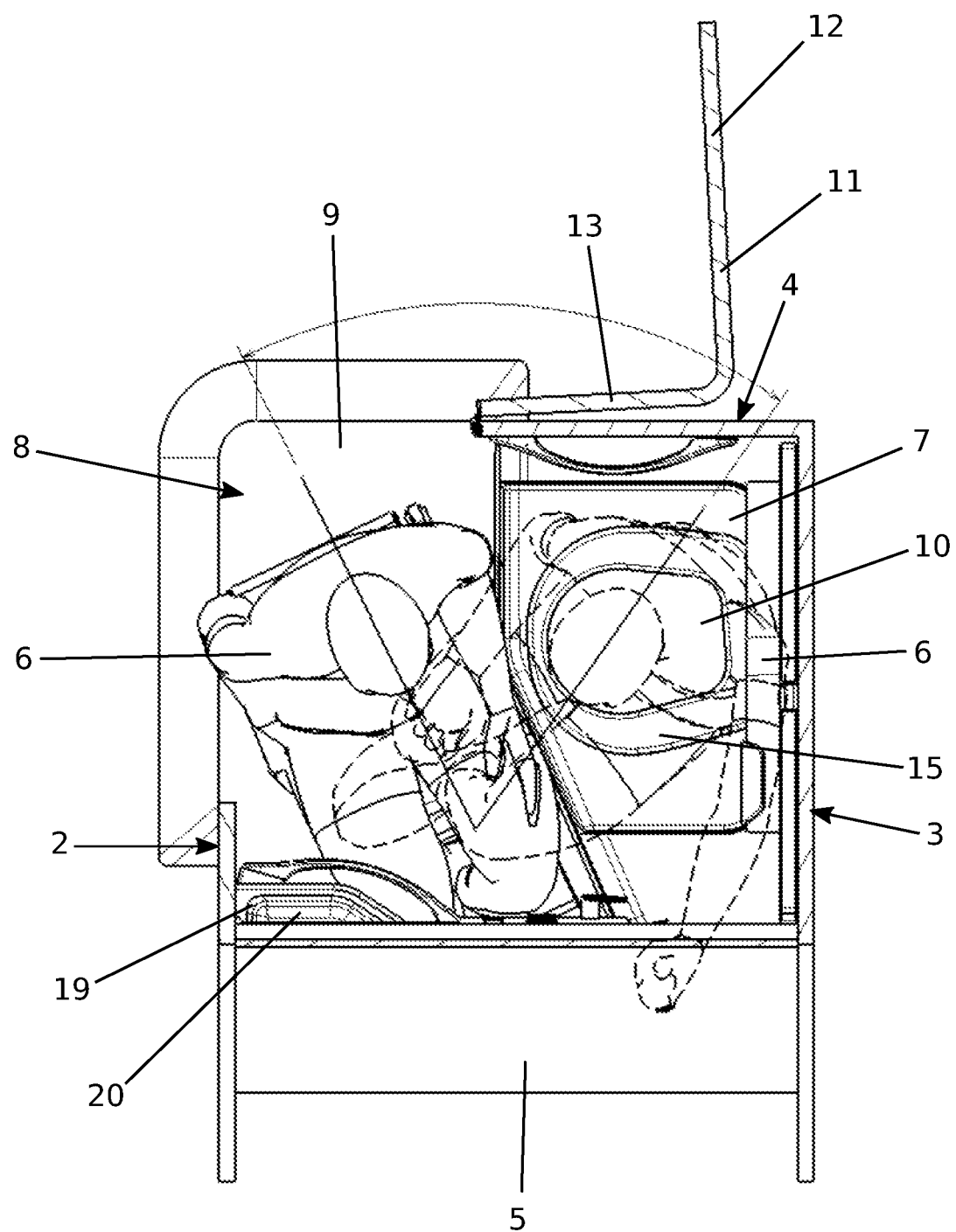
FIG. 8 shows the same view as FIG. 5, in which the person is shown in a superimposed manner sitting in the wheelchair and sitting on the toilet unit.

The toilet unit 7 has a lid 21, which is shown in the closed state in FIG. 2 and in the open state in the other figures. The toilet unit 7 also has multiple handles 22, 23, 24. (The handles 22, 23, 24 are not shown in FIG. 2.) It can be seen in FIGS. 6 to 8 that a wheelchair user 6 only has to turn by a small turning angle to sit on the seat area 18. As can be seen in particular in FIGS. 7 and 8, the person 6 does not have to sit on the toilet unit 7 normally to the rear long 3 but can form an angle of, for example, 20° with the normal. In FIG. 8, the sitting position of the person 6 on the toilet unit 7 is shown with dashed lines.

A cabinet, for example, is provided on the rear short side 5. Since the rear short side 5 is curved, a part of the rear short side 5 conceals a part of the internal fittings of the on-board toilet cubicle 1 in the view from above in FIGS. 3 to 8. The maximum extent of the rear short side 5 to the rear is indicated by the rear line.

The invention claimed is:

1. An on-board toilet cubicle comprising:
    a front long side and a rear long side,
    a front short side and a rear short side, which are each connected at one end to the front long side and at their other end to the rear long side,
    the front and rear long sides and the front and rear short sides enclosing an interior of the on-board toilet cubicle, and the front and the rear long sides each being wider than the front and the rear short sides,
    a toilet unit with a toilet opening, and
    an L-shaped door for accessing the on-board toilet cubicle, the L-shaped door comprising one door leg in the front long side and one door leg in the front short side, wherein
    the toilet unit is arranged adjacent to the rear long side, and the one door leg in the front long side is wider than the one door leg in the front short side.

2. The on-board toilet cubicle according to claim 1, wherein
    a toilet seat axis forms an angle of less than 45° with a normal of the rear long side, wherein the toilet seat axis runs substantially parallel to the normal of the rear long side.

3. The on-board toilet cubicle according to claim 1, wherein
    a hinge point of the L-shaped door is provided on the front short side.

4. The on-board toilet cubicle according to claim 1, wherein
    the perpendicular distance of the toilet opening from the front long side is more than 1.5 times the perpendicular distance of the centre point of the toilet opening from the rear long side.

5. The on-board toilet cubicle according to claim 4, wherein
    the perpendicular distance of the toilet opening from the front long side is more than 25% of the width of the rear short side and/or the front short side.

6. The on-board toilet cubicle according to claim 5, wherein
    the perpendicular distance of the centre point of the toilet opening from the front short side is more than 15% of the width of the rear long side.

7. The on-board toilet cubicle according to claim 5, wherein
    the perpendicular distance of the centre point of the toilet opening from the rear short side is more than 25% of the width of the rear long side.

8. The on-board toilet cubicle according to claim 1, wherein
    the toilet unit comprises a seat area in which the toilet opening is provided, wherein an oblique section of a horizontal edge, facing the front long side, of the seat area forms an angle of between 1° and 60° with the rear long side.

9. The on-board toilet cubicle according to claim 8, wherein
    the oblique section of the horizontal edge of the seat area lies on a straight line which intersects the door leg on the front short side.

10. The on-board toilet cubicle according to claim 8, wherein
    a starting point, facing the front short side, of the oblique section of the edge on the seat area has a perpendicular distance from the front short side which is smaller than the longitudinal extent of the one door leg on the front long side.

11. The on-board toilet cubicle according to claim 4, comprising
    a washbasin unit with a washbasin, wherein the washbasin unit is arranged adjacent to the rear short side.

12. The on-board toilet cubicle according to claim 11, wherein
    the washbasin is arranged adjacent to the front long side.

13. The on-board toilet cubicle according to claim 11, wherein
    the toilet opening is arranged at a horizontal distance of less than 1.5 m from the washbasin.

14. The on-board toilet cubicle according to claim 11, wherein
the perpendicular distance of the washbasin from the rear long side is more than 50% of the length of the rear short side.

15. An aircraft, comprising an on-board toilet cubicle according to claim 1.

16. The aircraft according to claim 15, wherein
the on-board toilet cubicle is arranged such that a corridor adjoining the front short side leads to a seating area for passengers.

17. The on-board toilet cubicle according to claim 9, wherein the oblique section of the edge of the seat lies on a straight line which intersects the half of the door leg which is closer to the rear long side.

* * * * *

UNITED STATES PATENT AND TRADEMARK OFFICE
CERTIFICATE OF CORRECTION

PATENT NO. : 12,030,638 B2
APPLICATION NO. : 17/756903
DATED : July 9, 2024
INVENTOR(S) : Jesus Rodriguez-Conde et al.

Page 1 of 1

It is certified that error appears in the above-identified patent and that said Letters Patent is hereby corrected as shown below:

On the Title Page

Item (30), Foreign Application Priority Data, should read as follows:
Dec. 4, 2019 (AT) .............................. GM 50213/2019

Signed and Sealed this
Third Day of June, 2025

Coke Morgan Stewart
*Acting Director of the United States Patent and Trademark Office*